US012403431B2

(12) United States Patent
Tamminga et al.

(10) Patent No.: US 12,403,431 B2
(45) Date of Patent: Sep. 2, 2025

(54) CONED AUGER

(71) Applicant: JAY-LOR INTERNATIONAL INC., East Garafraxa (CA)

(72) Inventors: Jakob Tamminga, East Garafraxa (CA); Nathan Bouwman, Fergus (CA)

( * ) Notice: Subject to any disclaimer, the term of this patent is extended or adjusted under 35 U.S.C. 154(b) by 146 days.

(21) Appl. No.: 17/673,060

(22) Filed: Feb. 16, 2022

(65) Prior Publication Data

US 2023/0256402 A1 Aug. 17, 2023

Related U.S. Application Data

(60) Provisional application No. 63/151,180, filed on Feb. 19, 2021.

(51) Int. Cl.

| | |
|---|---|
| ***B01F 27/192*** | (2022.01) |
| ***B01F 27/1145*** | (2022.01) |
| ***B01F 27/117*** | (2022.01) |
| ***B01F 27/722*** | (2022.01) |
| *B01F 101/18* | (2022.01) |
| *B01F 101/33* | (2022.01) |

(52) U.S. Cl.

CPC ........ *B01F 27/192* (2022.01); *B01F 27/1145* (2022.01); *B01F 27/117* (2022.01); *B01F 27/722* (2022.01); *B01F 2101/18* (2022.01); *B01F 2101/33* (2022.01); *B01F 2215/0422* (2013.01)

(58) Field of Classification Search

CPC .............. B01F 2101/33; B01F 2101/18; B01F 2215/0422; B01F 27/722; B01F 27/1145; B01F 27/117

See application file for complete search history.

(56) References Cited

U.S. PATENT DOCUMENTS

| | | | | |
|---|---|---|---|---|
| 2,813,704 A * | 11/1957 | Mackissic | B01F 33/5023 198/312 |
| 3,175,737 A * | 3/1965 | Schnell | A01C 15/16 222/274 |
| 3,244,271 A * | 4/1966 | Wenning | A01D 61/002 198/669 |

(Continued)

FOREIGN PATENT DOCUMENTS

| | | | |
|---|---|---|---|
| CA | 877683 A * | 8/1971 | |
| EP | 1596652 B1 * | 9/2006 | A01F 29/005 |
| WO | WO-2009154698 A1 * | 12/2009 | B29C 33/76 |

OTHER PUBLICATIONS

Zareiforoush, H., Komarizadeh, M. H., & Alizadeh, M. R. (2010). A. Review on screw conveyors performance evaluation during handling process. J. Sci. Rev, 2, 55-63. (Year: 2010).*

*Primary Examiner* — Claire X Wang
*Assistant Examiner* — Patrick M McCarty
(74) *Attorney, Agent, or Firm* — H. Jay Spiegel

(57) ABSTRACT

Coned augers for bulk mixers are described. The coned augers comprise first end and second end an auger post having a first end opposite a second end; fighting extending along and about the auger post, the pitch oriented to move bulk material generally from the first end toward the second end during operation of the auger; a coned section along the auger post, the coned section comprising a first cone protruding about the periphery of the auger post, the first cone having a tapered end opposite a wide end. Mixers comprising the coned augers are also described.

19 Claims, 13 Drawing Sheets

(56) References Cited

U.S. PATENT DOCUMENTS

| | | | | | |
|---|---|---|---|---|---|
| 3,263,276 | A * | 8/1966 | Maier | B29C 45/50 | 425/208 |
| 3,421,740 | A * | 1/1969 | Behrens | B01F 27/726 | 366/186 |
| 3,702,128 | A * | 11/1972 | Trotter | B65G 53/08 | 198/582 |
| 3,728,053 | A * | 4/1973 | Stillhard | B29C 45/50 | 264/DIG. 83 |
| 4,453,375 | A * | 6/1984 | Field | A01D 61/008 | 56/364 |
| 5,356,054 | A * | 10/1994 | Loppoli | B01F 27/726 | 241/101.76 |
| 5,385,403 | A * | 1/1995 | Knight | A01C 3/063 | 366/603 |
| 5,622,323 | A * | 4/1997 | Krueger | B01F 33/5023 | 241/101.76 |
| 5,967,657 | A * | 10/1999 | West | A01K 5/002 | 366/195 |
| 5,984,218 | A * | 11/1999 | Peat | B01F 27/726 | 241/294 |
| 6,328,919 | B1 * | 12/2001 | Pham | B29C 48/76 | 425/208 |
| 11,426,701 | B2 * | 8/2022 | Gruber | B29B 7/484 | |
| 2014/0001678 | A1 * | 1/2014 | Hara | B29C 45/60 | 264/328.14 |
| 2019/0270057 | A1 * | 9/2019 | Tamminga | B01F 33/502 | |

* cited by examiner

CONED AUGER

CROSS-REFERENCE TO RELATED APPLICATIONS

This application claims the benefit of priority to U.S. provisional application 63/151,180, filed Feb. 19, 2021, the entire contents of which are hereby incorporated by reference.

FIELD OF THE INVENTION

The invention relates to agricultural machinery and more specifically to horizontal augers and bulk mixers comprising a coned auger for use in mixing bulk material such as feed, compost, animal bedding, fertilizer, etc.

BACKGROUND OF THE INVENTION

Horizontal mixers are typically used to mix bulk material such as agricultural material including feed and bedding. Conventional mixers typically include one or more augers positioned horizontally and operate at about 5-12 rpm to mix the bulk material. Generally, a significant amount of horsepower is required to rotate the augers as the load to be mixed can be very large and can range for example from 2,000 to 40,000 pounds.

Further, the amount of time required to sufficiently mix the material can be significant and can be frustrating for the user as it can take up to 8-10 minutes to sufficiently mix a load or longer.

The horizontally positioned augers may be ribbon augers or solid fighting augers having a fighting positioned away from a central auger post. The fighting typically has a pitch oriented to draw material away from the ends of the mixer toward the center and typically to a conversion zone or spot which generally aligns with a door in the side of the mixer. Operation of the traditional auger in a mixer such as a horizontal mixer can result in compressing, clumping of the mix and/or the break down or destruction or reduction of effective fiber in the feed. Dead spaces may also be generated in the mixer during mixing. Uneven unloading of the mixer may also be observed.

A need therefore exists for an auger for use in a mixer, for example a horizontal mixer, that mitigates any of the downsides referred to above or as observed in the industry.

SUMMARY OF THE INVENTION

In one embodiment, the present invention provides for a coned auger for a bulk mixer, the coned auger comprising:

- an auger post having a first end opposite a second end;
- fighting extending along and about the auger post, the pitch oriented to move bulk material generally from the first end toward the second end during operation of the auger;
- a coned section along the auger post, the coned section comprising a first cone protruding about the periphery of the auger post, the first cone having a tapered end opposite a wide end.

In a further embodiment of the coned auger or coned augers as outlined above, the auger is a ribbon auger and the fighting is ribbon fighting.

In a further embodiment of the coned auger or coned augers as outlined above, the first cone is generally positioned substantially at or near the second end of the auger post, the tapered end oriented toward the first end of the auger post and the wide end oriented toward the second end of the auger post.

In a further embodiment of the coned auger or coned augers as outlined above, the coned section further comprises a second cone protruding from the auger post comprising a tapered end opposite a wide end and wherein the second cone has an orientation opposite to the first cone and wherein a wide end of the second cone abuts or is adjacent to the wide end of the first cone.

In a further embodiment of the coned auger or coned augers as outlined above, the fighting or ribbon fighting comprises a first pitch section comprising a pitch oriented to move bulk material generally from the first end toward the second end and a second pitch section situated opposite the first pitch section and having an orientation to move bulk material generally from the second end toward the first end of the auger, and wherein the position at which the first pitch section meets the second pitch section defines a conversion point, and wherein the coned section overlaps with the conversion point.

In a further embodiment of the coned auger or coned augers as outlined above, the auger or augers further comprise plating spanning the distance from the ribbon fighting to the first, and optionally second cone, in the coned section thereby forming solid auger fighting in the coned section.

In a further embodiment of the coned auger or coned augers as outlined above, the plating is integrated into the fighting in the coned section and the coned section comprises solid fighting.

In a further embodiment of the coned auger or coned augers as outlined above, the auger or augers further comprise auger paddles mounted to the auger for aiding unloading of the mixing chamber.

In a further embodiment of the coned auger or coned augers as outlined above, the first and/or second cone is a round cone or pyramidal cone of 3 or more sides.

In a further embodiment of the coned auger or coned augers as outlined above, a diameter of the wide end of the first or second cone is less than a diameter of fighting.

In a further embodiment of the coned auger or coned augers as outlined above, the first cone and/or the second cone have a generally frustum shape.

In a further embodiment of the coned auger or coned augers as outlined above, the first cone and the second cone have a different taper angle.

In a further embodiment of the coned auger or coned augers as outlined above, a taper angle of the first cone is 135° or greater, optionally 140° or greater, optionally 145° or greater, optionally 150° or greater, optionally 155° or greater, optionally 160° or greater, optionally 165° or greater, optionally 170° or greater or optionally 175° or greater.

In a further embodiment of the coned auger or coned augers as outlined above, the pitch of the fighting or ribbon fighting is at least the same as the diameter of the fighting or ribbon fighting.

In a further embodiment of the coned auger or coned augers as outlined above, the pitch of the fighting or ribbon fighting is about 150 percent the diameter of the fighting or ribbon flighting.

In another embodiment, the present invention provides for a bulk mixer for mixing a bulk material, the bulk mixer comprising:

a mixing chamber for containing the bulk material to be mixed;

an exit door for expelling mixed bulk material from the mixing chamber; and a coned auger in the mixing chamber, the coned auger as defined herein.

In a further embodiment of the mixer or mixers as outlined above, the coned auger is as defined herein, wherein the conversion point is generally in line with the outlet or overlaps with the outlet in the mixing chamber and the coned section is generally in line with the exit door.

In a further embodiment of the mixer or mixers as outlined above, the bulk mixer is a horizontal mixer.

In yet another embodiment, the present invention provides for a horizontal mixer for mixing bulk material, the horizontal mixer comprising:

a mixing chamber for accommodating bulk material to be mixed, the mixing chamber comprising:

side walls connected at their bottom edges by a trough;

a front wall spanning a front side of the container;

a rear wall spanning a rear side of the container; and an exit door through which mixed material can exit;

one or more bottom augers situated longitudinally in the trough, wherein at least one of the one or more bottom augers is a coned auger as defined herein; and one or more top augers situated longitudinally in the mixing container substantially above the one or more bottom augers;

wherein the trough has a shape to accommodate the one or more bottom augers; and optionally a taper angle of the first cone is 135° or greater, optionally 140° or greater, optionally 145° or greater, optionally 150° or greater, optionally 155° or greater, optionally 160° or greater, optionally 165° or greater, optionally 170° or greater or optionally 175° or greater.

In a further embodiment of the mixer or mixers as outlined above, the fighting or ribbon fighting comprises a first pitch section comprising a pitch oriented to move bulk material generally from the front wall toward the exit door and a second pitch section situated opposite the first pitch section and having an orientation to move bulk material generally from the back wall toward the exit door of the auger, and wherein the position wherein the first pitch section meets the second pitch section defines a conversion point, and wherein the coned section overlaps with the conversion point.

In a further embodiment of the mixer or mixers as outlined above, the conversion point is generally in line with the exit door or overlaps with the exit door in the mixing chamber and the coned section is generally in line or overlaps with the exit door.

In a further embodiment of the mixer or mixers as outlined above, there are at least two bottom augers and the at least two bottom augers are coned augers, each independently as defined in herein, the at least two bottom augers being defined as an exit door side bottom auger situated on the side of the mixing chamber comprising the exit door and a non-exit door side bottom auger situated on the side of the mixing chamber that does not comprise the exit door.

In a further embodiment of the mixer or mixers as outlined above, the exit door side bottom auger has the coned section positioned to overlap with the exit door.

In a further embodiment of the mixer or mixers as outlined above, the wide end of the first or second cone of the exit door side bottom auger has a smaller diameter than the wide end of the first or second cone of the non-exit door side bottom auger.

In a further embodiment of the mixer or mixers as outlined above, the wide end of the first or second cone of the exit door side bottom auger has a larger diameter than the wide end of the first or second cone of the non-exit door side bottom auger.

In a further embodiment of the mixer or mixers as outlined above, the coned section of the non-exit door side bottom auger is not in-line with the coned section of the exit door side bottom auger.

In a further embodiment of the mixer or mixers as outlined above, the coned section of the non-exit door side bottom auger is in-line with the coned section of the exit door side bottom auger.

In a further embodiment of the mixer or mixers as outlined above, the coned section of the non-exit door side bottom auger overlaps with the coned section of the exit door side bottom auger.

In a further embodiment of the mixer or mixers as outlined above, the coned section of the exit door side bottom auger is comprised of a first and/or second cone having a different taper angle than a first and/or second cone of the non-exit door side bottom auger.

In a further embodiment of the mixer or mixers as outlined above, the one or more top augers is a ribbon auger.

DETAILED DESCRIPTION

Described herein are examples and embodiments of coned augers and horizontal mixers comprising coned augers including apparatuses, systems therefor and methods and processes of using same, for mixing bulk material such as agricultural material for example feed, compost or bedding. It will be appreciated that embodiments and examples are provided herein for illustrative purposes intended for those skilled in the art, and are not meant to be limiting in any way. All references to embodiments or examples throughout this disclosure should be considered as references to illustrative and non-limiting embodiments and illustrative and non-limiting examples. It will be appreciated that none of the features disclosed herein are intended to be essential unless specifically stipulated as such. Reference to any dimensions or measurements is for illustrative purposes and not intended to be limiting and is not intended to be an exact and limiting measurement and the term "about" is intended to be applied to all such dimensions and measurements and at least accounts for inaccuracies and error associated with taking such measurements and the devices for taking such measurements.

An auger having a coned section which aids in more effectively mixing a bulk material in a bulk mixer is disclosed herein. It has been determined that adding a coned section to an auger, such as a ribbon auger or a solid auger can allow for the auger to more effectively mix a bulk material when used in a mixer, for example a horizontal mixer. Using a coned auger can potentially reduce mix times and/or the energy required to mix a bulk material, reduce clumping and/or compression of the mixing material, reduce dead spots in the mix, and/or may reduce damage to effective fibre in a feed mix.

A coned auger according to the present invention may be used in a bulk mixer such as a bulk agricultural mixer, such as a bulk feed mixer and may be used in a horizontal bulk mixer such as a horizontal agricultural mixer, such as a horizontal feed mixer. An example of a horizontal mixer suitable for use with a coned auger is shown in Canadian patent application 3,034,724 filed Feb. 22, 2019 and entitled "Horizontal Mixer With Stacked Augers" incorporated herein by reference in its entirety.

Figure 1:
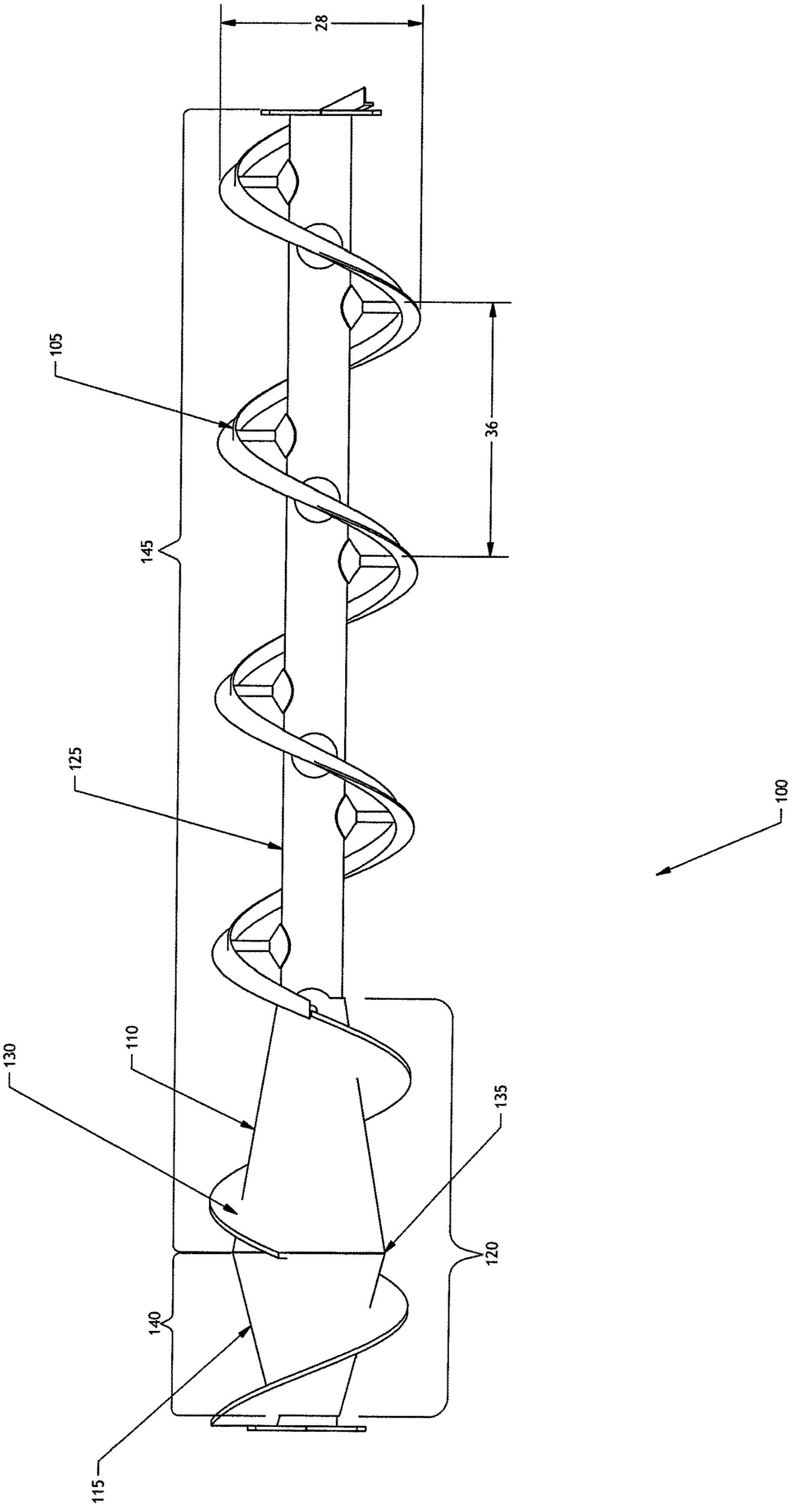
FIG. 1 is a top schematic view illustrative of one embodiment of a coned ribbon auger according to one embodiment of the invention.
Figure 2:
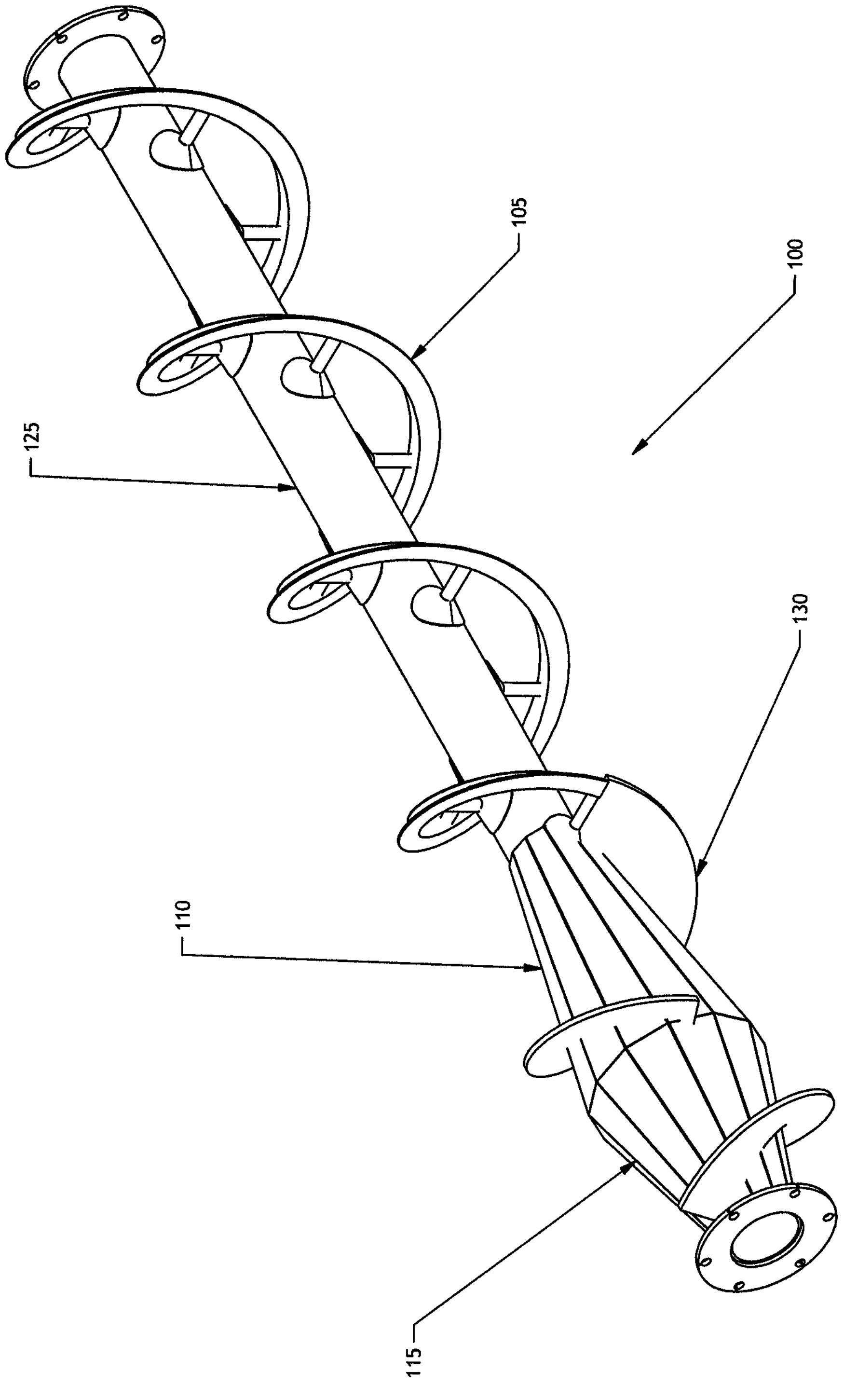
FIG. 2 is an isometric view of the coned ribbon auger shown in FIG. 1.

One example of a coned ribbon auger according to one aspect of the present invention is a coned ribbon auger shown generally at 100 in FIGS. 1 and 2. The coned ribbon auger 100 includes an auger post 125 along which ribbon fighting 105 runs. The ribbon fighting 105 has a pitch oriented to draw material from a first end of the auger 100 toward a second opposite end of the auger 100. The ribbon auger 100 may alternatively have a pitch oriented to draw material from a second end of the auger 100 toward a first end of the auger 100. The auger 100 shown in FIGS. 1 and 2 includes fighting having a first pitch section 145 oriented to draw material away from the first end of the auger 100 toward the second end of the auger 100 and a second pitch section 140 oriented to draw material away from the second end of the auger 100 toward the first end of the auger 100. This may also be referred to as forward fighting and reverse fighting. The point where the first pitch section 145 and the second pitch section 140 meet is referred to as the conversion point 135. When the auger 100 is situated in a mixer, the pitch is oriented to draw material away from an end wall of the mixing chamber. When the auger 100 has two pitch sections 140 and 145, operation of the auger draws material away from each end of the mixing chamber of the mixer. The conversion point 135 may be situated such that it is in-line with or overlaps with an exit door in the mixing chamber. This is especially useful if a single auger is used, or if a single bottom auger is used in a stacked auger setup, or multiple augers are used and the exit door side auger has a conversion point that overlaps with or is in-line with the exit door. This is explained in more detail with reference to FIGS. 9A to 11.

The coned ribbon auger 100 also includes a coned section 120 that is made up of a first cone 110 and optionally a second cone 115. Each cone has a tapered end opposite a wide end. As shown in FIGS. 1 and 2, the first cone 110 has an opposite orientation to the second cone 115 and their wide ends abut or are adjacent. Typically, the coned section 120 overlaps with the conversion point 135. In one embodiment, the conversion point 135 is at the point where the first cone 110 and the second cone 115 abut one another.

The coned section 120 may have cones whose diameter at their wide end is no more than the external diameter of the fighting 105 also referred to as the diameter of the auger.

In the coned section 120, the ribbon fighting 105 may include plating 130 spanning the gap between the cone 110 or 115 and the ribbon fighting, resulting is solid fighting in the coned section 120. The plating 130 prevents material from wrapping around the cone 110 and/or 115 and getting stuck between the cones and the fighting 105 during operation of the auger 100. During manufacture of the auger 100, the coned section 120 may be added to the auger post 125 and then the fighting may be added. Solid fighting may be added around the coned section 120 and ribbon fighting may be added along all or substantially all of the remaining auger post. The plating 130 may be integrated directly into the fighting of the coned section 120.

It has been observed that using a coned auger such as that shown with reference to FIGS. 1 and 2 can result in mixing of a bulk material in a horizontal auger in a much reduced time while using the same amount of energy to power the mixer. A user can also reduce the amount of energy used and still obtain a reduced mix time or similar mix time if the energy is even further reduced. This can result in a reduced power consumption, reduced fuel consumption and reduced carbon impact.

Furthermore, it has been observed that the coned auger appears to push feed out of the exit door in a horizontal mixer more gently and more quickly. The coned auger appears to mix the bulk material without compressing it as much as a traditional solid auger or a traditional ribbon auger and the mixed feed rolls out the door in much better shape with less damage to effective fibre.

For example, when using a steam flaked corn, a mixer using a traditional ribbon auger has been observed to crumple it and generate compressed crumbs which reduces the effective fibre. Avoiding or reducing the break down or destruction of effective fibre is preferable.

Figure 3:
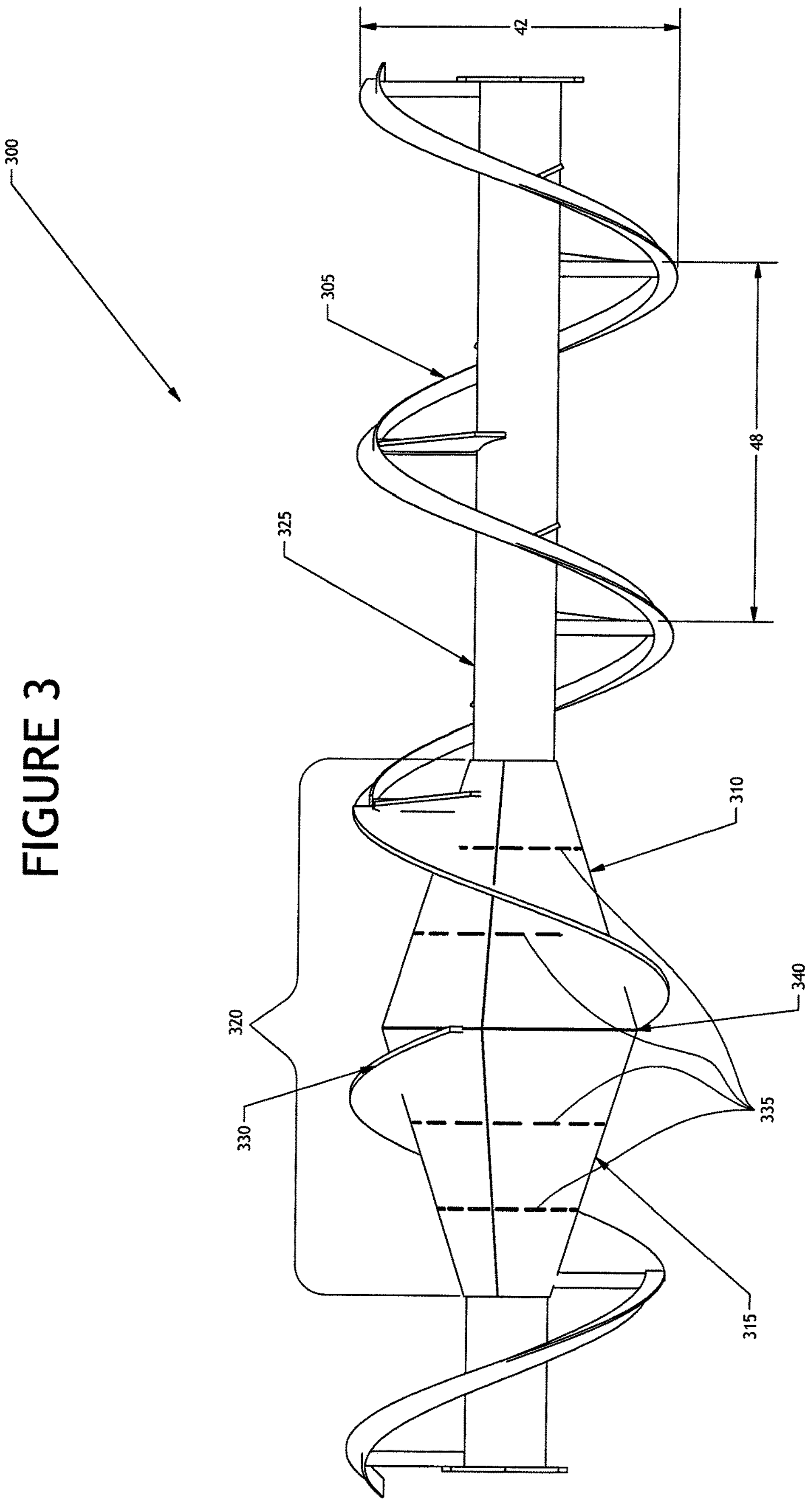
FIG. 3 is a top schematic view illustrative of another embodiment of a coned ribbon auger according to one embodiment of the invention.

As can be seen in the coned section 120 in FIGS. 1 and 2, the first cone 110 and the second cone 115 can have different lengths which results in a different taper angle between the cones 110 and 115. The taper angle being the angle formed by the auger post 125 and the cone 110 or 115. An example of the taper angle is shown in FIG. 3 where the second cone 315 has a taper angle of 163°. An optional taper angle of 135° or greater appears to be ideal but any suitable taper angle may be adopted. It will be appreciated that the first and second cones 110 and 115 may have similar dimensions or may be different. A cone may be longer than the other and have a different taper angle. Alternatively, the first cone 110 may have a larger or smaller diameter across the wide end than the second cone 115. Cones of different sizes and shapes may also be used and all cones are contemplated by the inventors and are within scope of the invention. Generally, the cones may have a frustum shape.

The exterior surface or shell of the cones may have a smooth round shape about their circumference and be made from a single section or multiple sections fixed together, for example by welding. The piece or pieces may be stamped in order to obtain the desired shape. The exterior surface or shell may be formed by a plurality of flat surfaces that abut each other at an angle to form a pyramid shape having multiple faces. Each face may be a separate piece joined together or may be formed by stamping, pressing or by a combination of these or other suitable techniques.

Any suitable interior frame may be used to support the exterior surface or shell. For example, one or more interior plates may be mounted to the auger post 105 to support the surface or shell so that the weight of the load to be mixed does not crush the cone. For example, as shown with reference to FIG. 3, a series of plates 335 are used to support the cone surface or shell on the auger post 325. The plates 335 may be made from any suitably strong material, for example steel or stainless steel. Further, although five plates are shown as being used to support the cones 310 and 315 in FIG. 3, any suitable number or orientation of the support plates may be used and any suitable support structure may be implemented as needed.

The pitch of the ribbon fighting 105 may vary and it will be appreciated that any suitable pitch may be used on the ribbon fighting 105 to mix bulk material as intended. The pitch may be very shallow or may be 100% or greater. The pitch is usually expressed as a length and can be expressed as a ratio as compared to the diameter of the ribbon auger. It has been observed that having a pitch of at least a 1:1 ratio of pitch:auger diameter, also expressed for the purposes of this disclosure as a pitch of least 100% tends to mix bulk material well. The pitch may be greater than 1:1 or greater than 100%. For example, the pitch in the first pitch section 145, where the diameter of the ribbon auger 105 is 28 inches and the pitch is 36 inches, is about 129%. The pitch of the ribbon fighting 305 of the auger 300 shown with reference to FIG. 3 is 48 inches, or 48:42 or 114%. The pitch may be as great as 3:2 or 150% or may be more. It is contemplated that the pitch may be any suitable pitch that allows for usable mix to be generated by operation of the coned auger in a mixer. It is also contemplated that the pitch in the first pitch section 145 may be different than or the same as the pitch in the second pitch section 140.

It will be appreciated that the auger 100 may be fabricated from any suitable material or combination of material and it is not intended for the material to be limiting in any way. The auger 100 and the components therein may be made from steel or stainless steel and may be welded, stamped, cut or may be made using a press break or die or combination thereof.

Figure 4:
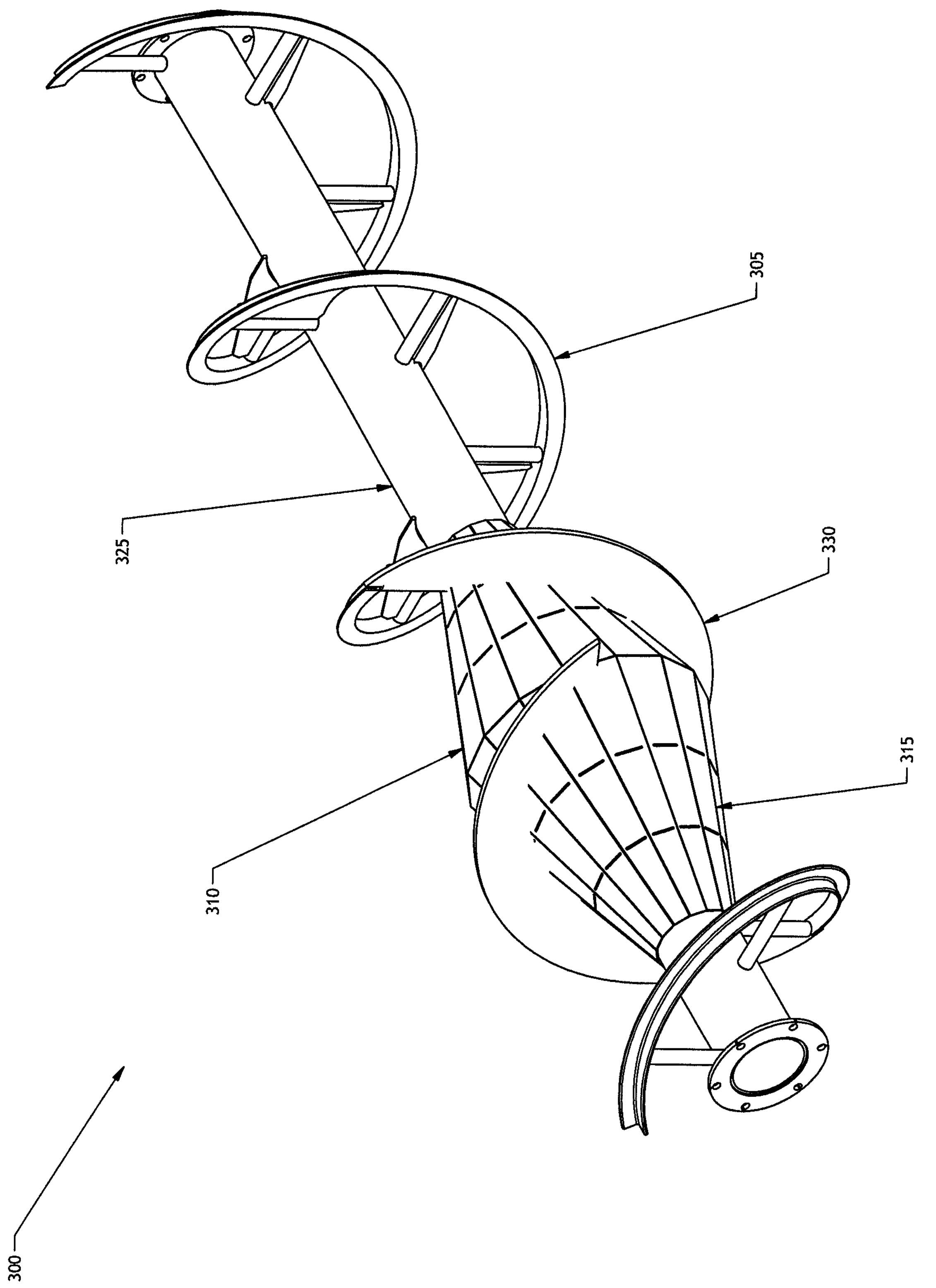
FIG. 4 is an isometric view of the coned ribbon auger shown in FIG. 3.

FIGS. 3 and 4 show another embodiment of a coned auger 300 for use in a bulk mixer. The coned auger 300 is generally similar to that shown with reference to FIGS. 1 and 2 in that the coned auger 300 comprises an auger post 325 along which ribbon fighting 305 runs. The ribbon fighting 305 has a pitch oriented to draw material away from each end and toward a conversion point 340 where opposite pitches meet. The coned auger 300 comprises a coned section 320 including a first cone 310 adjacent and oppositely oriented to a second cone 315. In the embodiment shown with reference to FIGS. 3 and 4, the first cone 310 and the second cone 315 have generally the same dimensions as opposed to the first and second cones of the auger 100 which had different lengths and different taper angles. In addition, the coned section 320 of the coned auger 300 is positioned somewhat inboard of the end of the auger post 325 where the coned section 120 of the coned auger 100 was generally at the end of the auger post 125. This illustrates that the coned section 320 may be situated as any suitable point along the auger post 325 and overlapping with the conversion point 340. The coned section 320 also includes the plating 330 spanning the gap between the cone 310 or 315 and the ribbon fighting 305, resulting is solid fighting in the coned section 320.

Figure 5:
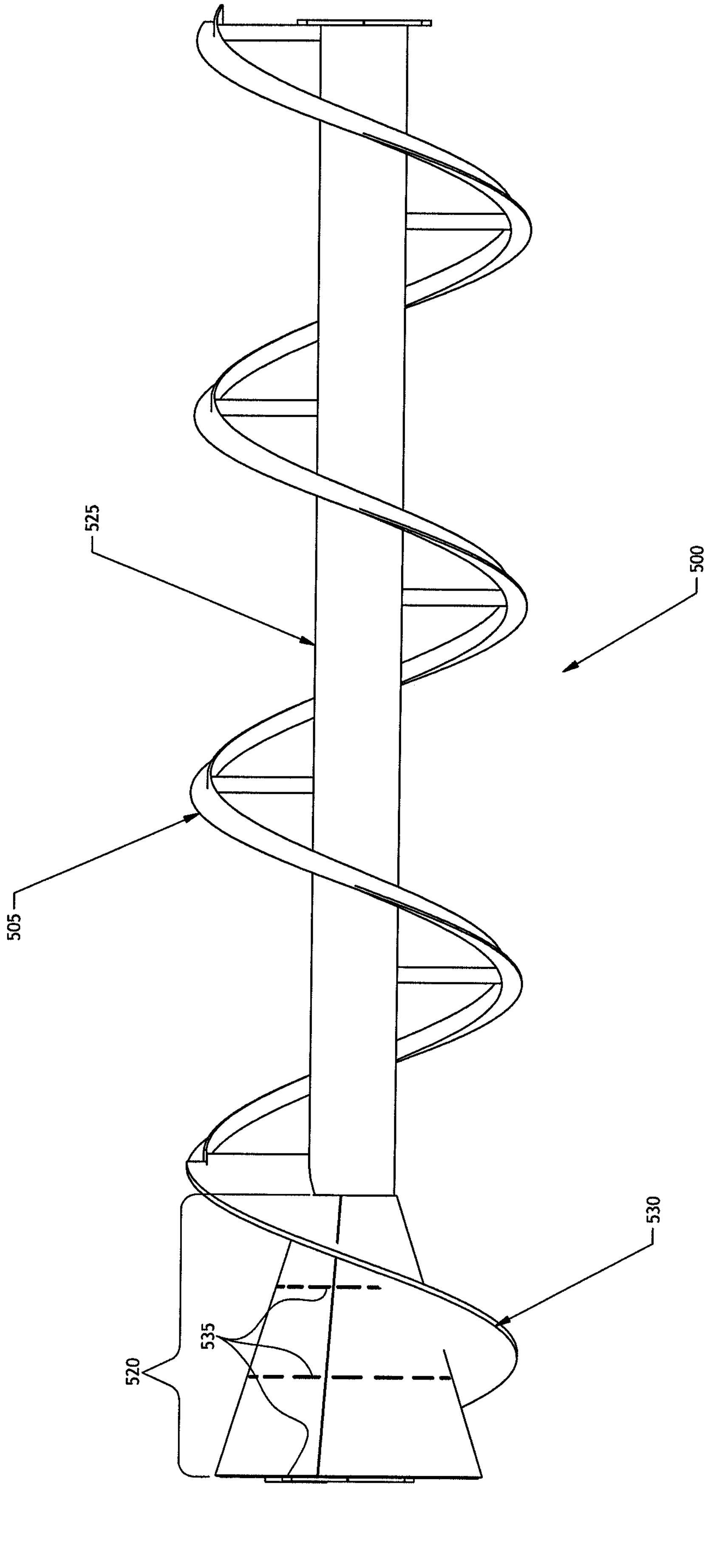
FIG. 5 is a top schematic view illustrative of another embodiment of a coned ribbon auger according to one embodiment of the invention.
Figure 6:
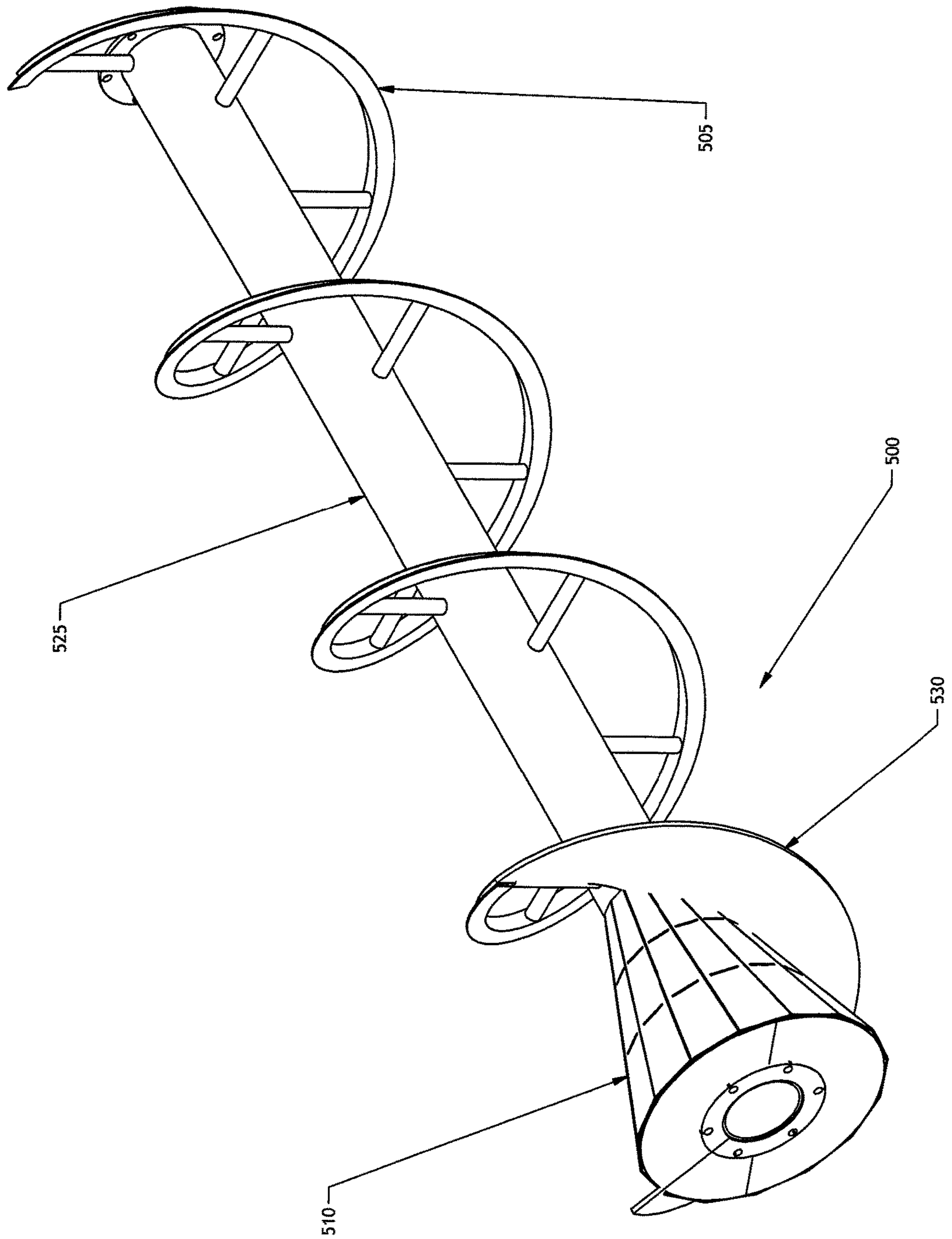
FIG. 6 is an isometric view of the coned ribbon auger shown in FIG. 5.

FIGS. 5 and 6 show another embodiment of a coned auger 500 which is comprised of a coned section 520 which includes only a first cone 510. The coned auger 500 comprises an auger post 525 along which ribbon fighting 505 runs. The ribbon fighting 505 has a pitch oriented to draw material away from one end and toward the other end of the auger 500. The auger 500 has only a first pitch and does not include a pitch designed to draw material away from the other end of the auger 500. As a result, the coned section 510 is positioned at the end of the auger 500 and includes only a single cone 510. There is no conversion point on the fighting 505 as there is no oppositely oriented pitch on the fighting. This illustrates that the coned section 520 may include only a single cone 510. It will be appreciated that the coned section may be positioned at the end of the auger 500 but it is also contemplated that the single cone 510 may be placed away from the end of the auger 500 toward the center and the auger fighting 505 may include a first and a second pitch oriented to draw material away from each side and that the single cone 510 may be positioned at the conversion point of the two pitches. The coned section 520 also includes the plating 530 spanning the gap between the cone 510 and the ribbon fighting 505, resulting is solid fighting in the coned section 520. The cone 510 includes a support structure comprised of a series of plates 535 used to support the cone surface or shell on the auger post 525. The plates 535 may be made from any suitably strong material, for example steel or stainless steel. Further, although three plates are shown as being used to support the cone 510 in FIG. 5, any suitable number or orientation of the support plates may be used and any suitable support structure may be implemented as needed.

Figure 7:
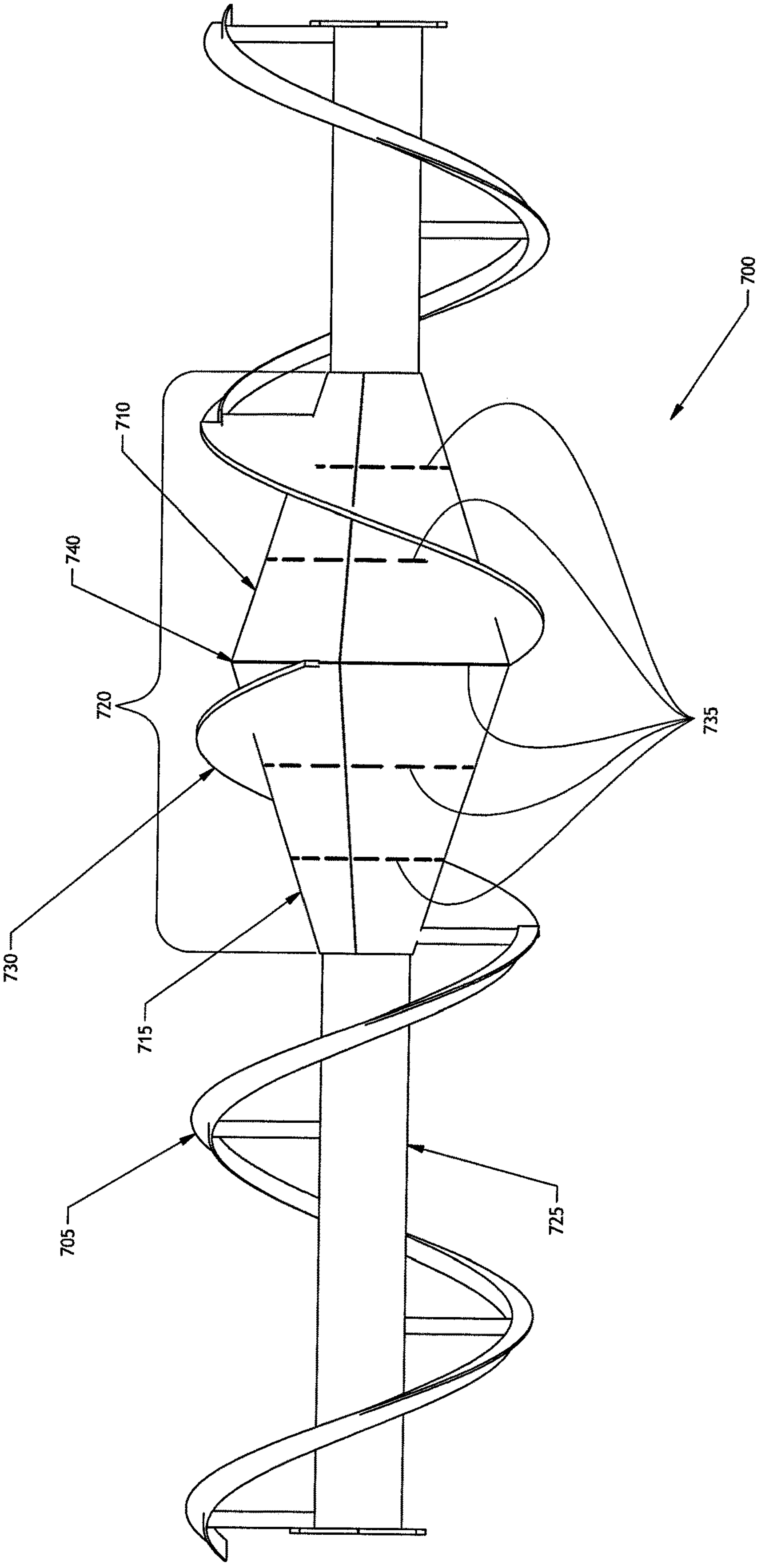
FIG. 7 is a top schematic view illustrative of another embodiment of a coned ribbon auger according to one embodiment of the invention.
Figure 8:
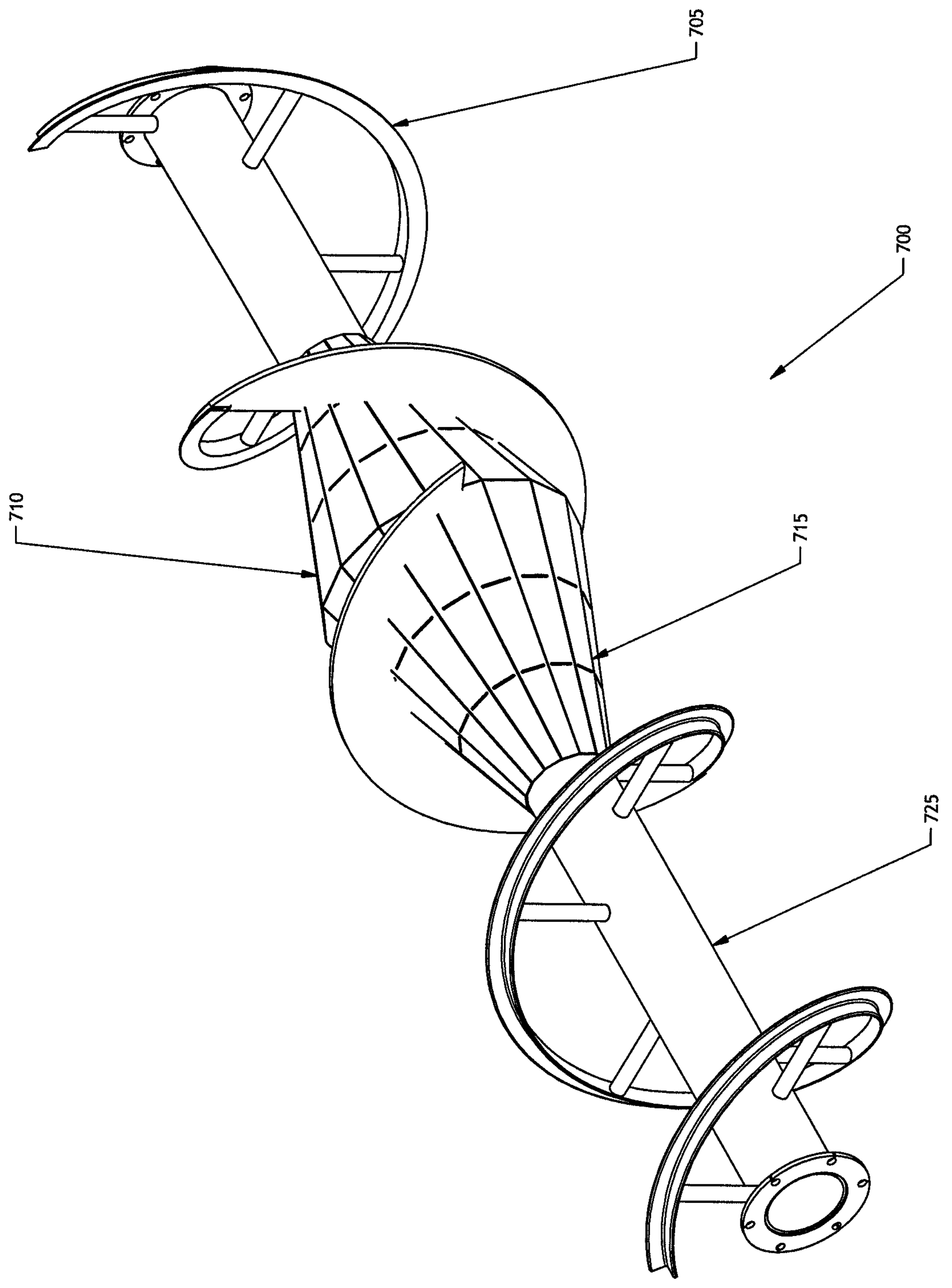
FIG. 8 is an isometric view of the coned ribbon auger shown in FIG. 7.

FIGS. 7 and 8 show another embodiment of a coned auger 700 similar to that shown with reference to FIGS. 3 and 4. The coned auger 700 comprises an auger post 725 along which ribbon fighting 705 runs. The ribbon fighting 705 has a pitch oriented to draw material away from each end and toward a conversion point 740 where opposite pitches meet. The coned auger 700 comprises a coned section 720 including a first cone 710 adjacent or abutting and oppositely oriented to a second cone 715. In the embodiment shown with reference to FIGS. 7 and 8, the first cone 710 and the second cone 715 have generally the same dimensions as opposed to the first and second cones of the auger 100 which had different lengths and different taper angles. In addition, the coned section 720 of the coned auger 700 is positioned generally central on the auger post 725 where the coned section 120 of the coned auger 100 was generally at the end of the auger post 125. This further illustrates that the coned section 720 may be situated as any suitable point along the auger post 725 and overlapping with the conversion point 740. The coned section 720 also includes the plating 730 spanning the gap between the cone 710 or 715 and the ribbon fighting 705, resulting is solid flighting in the coned section 720. The cones 710 and 715 include a support structure comprised of a series of plates 735 used to support the cone surface or shell on the auger post 725. The plates 735 may be made from any suitably strong material, for example steel or stainless steel. Further, although five plates are shown as being used to support the cones 710 and 715 in FIG. 7, any suitable number or orientation of the support plates may be used and any suitable support structure may be implemented as needed.

It will be appreciated that although a coned ribbon auger has been exemplified and illustrated in reference to FIGS. 1 to 8, it is within the contemplated invention that the auger may be a solid auger with a coned section and the invention is not limited to ribbon augers with a coned section.

Figure 9A:
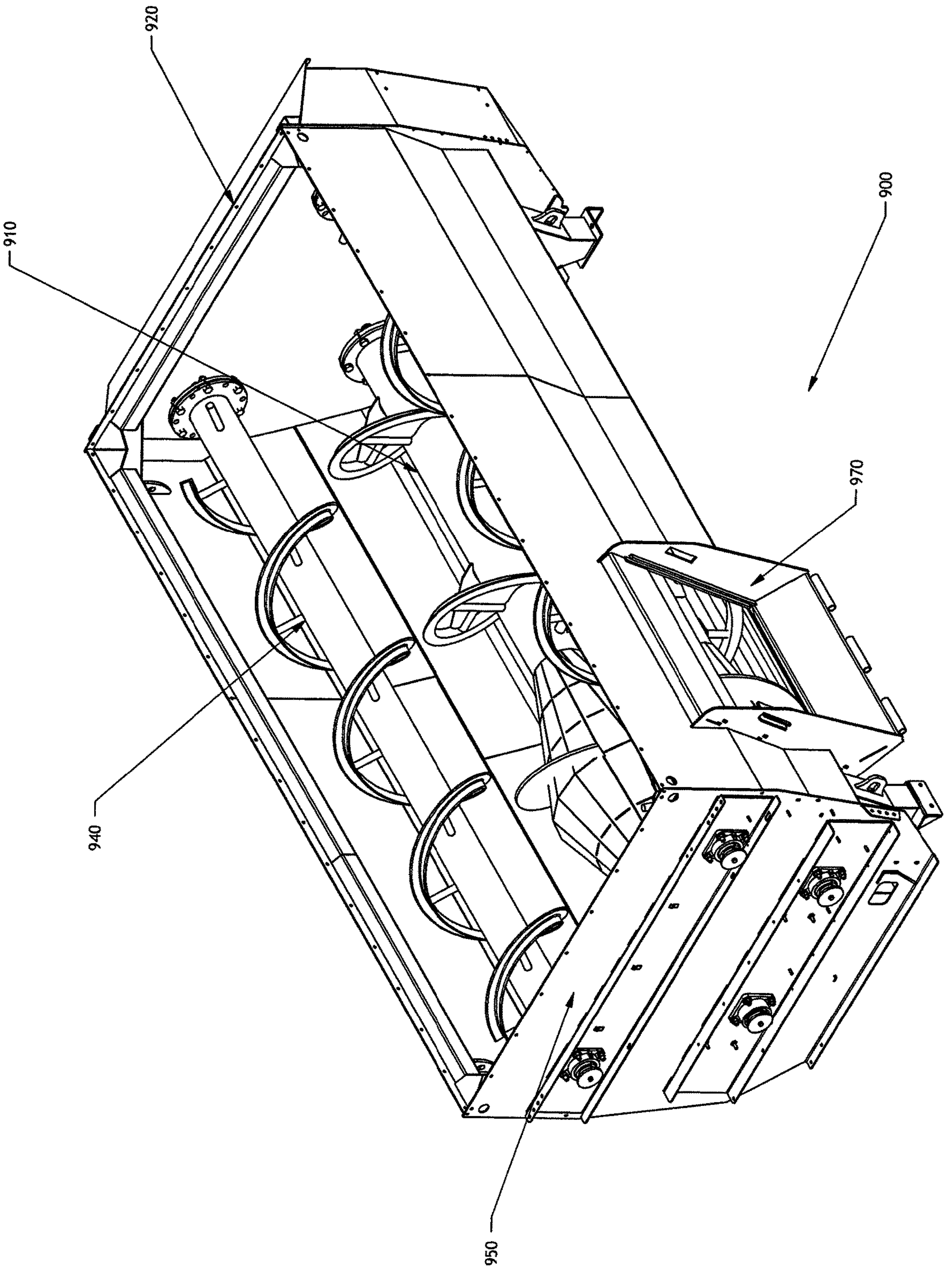
FIG. 9A is an isometric view illustrative of one embodiment of a bulk mixer comprising one embodiment of a coned ribbon auger according to the invention.
Figure 9B:
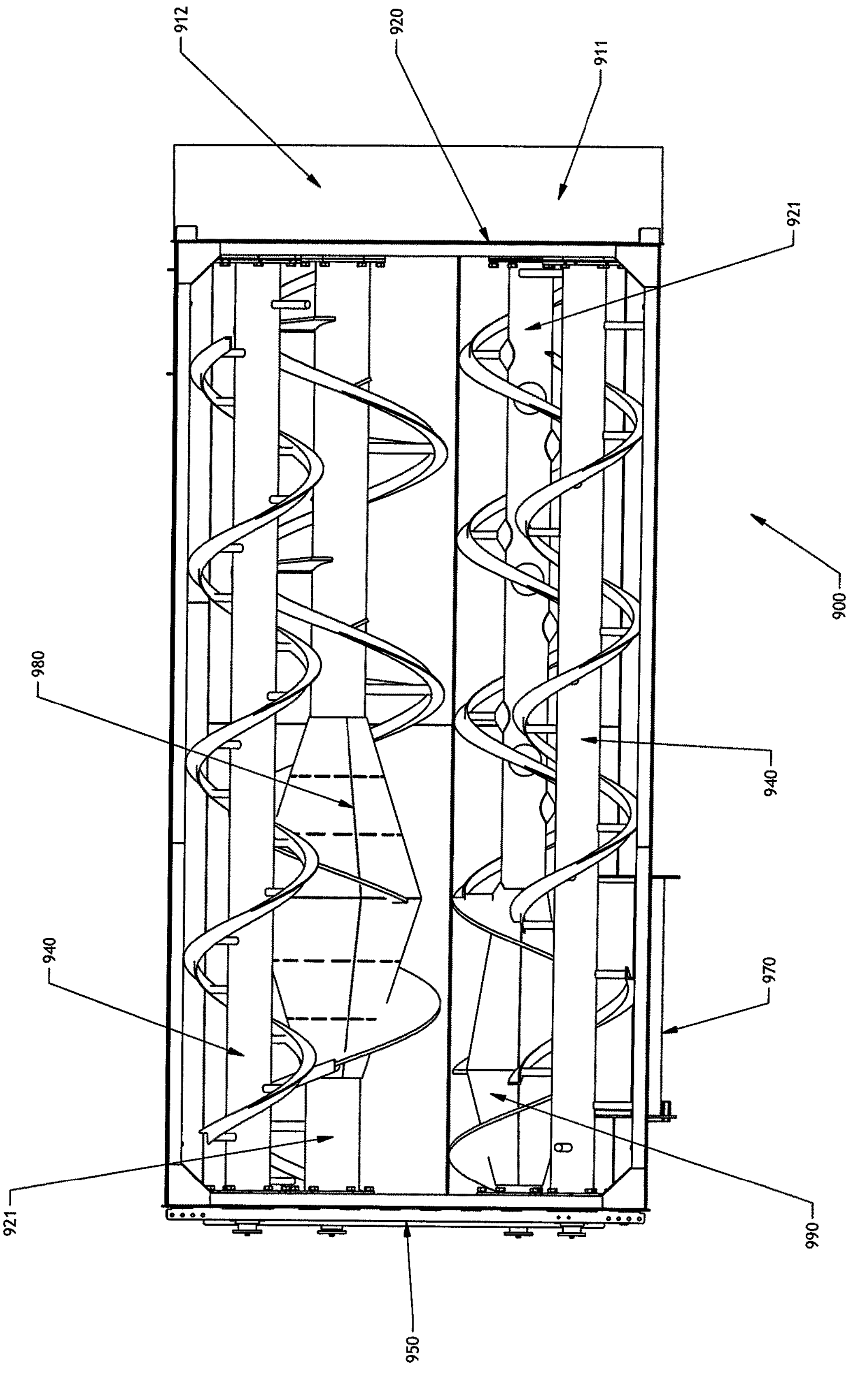
FIG. 9B is a top schematic view illustrative of the bulk mixer and coned ribbon auger as shown in FIG. 9A.
Figure 9C:
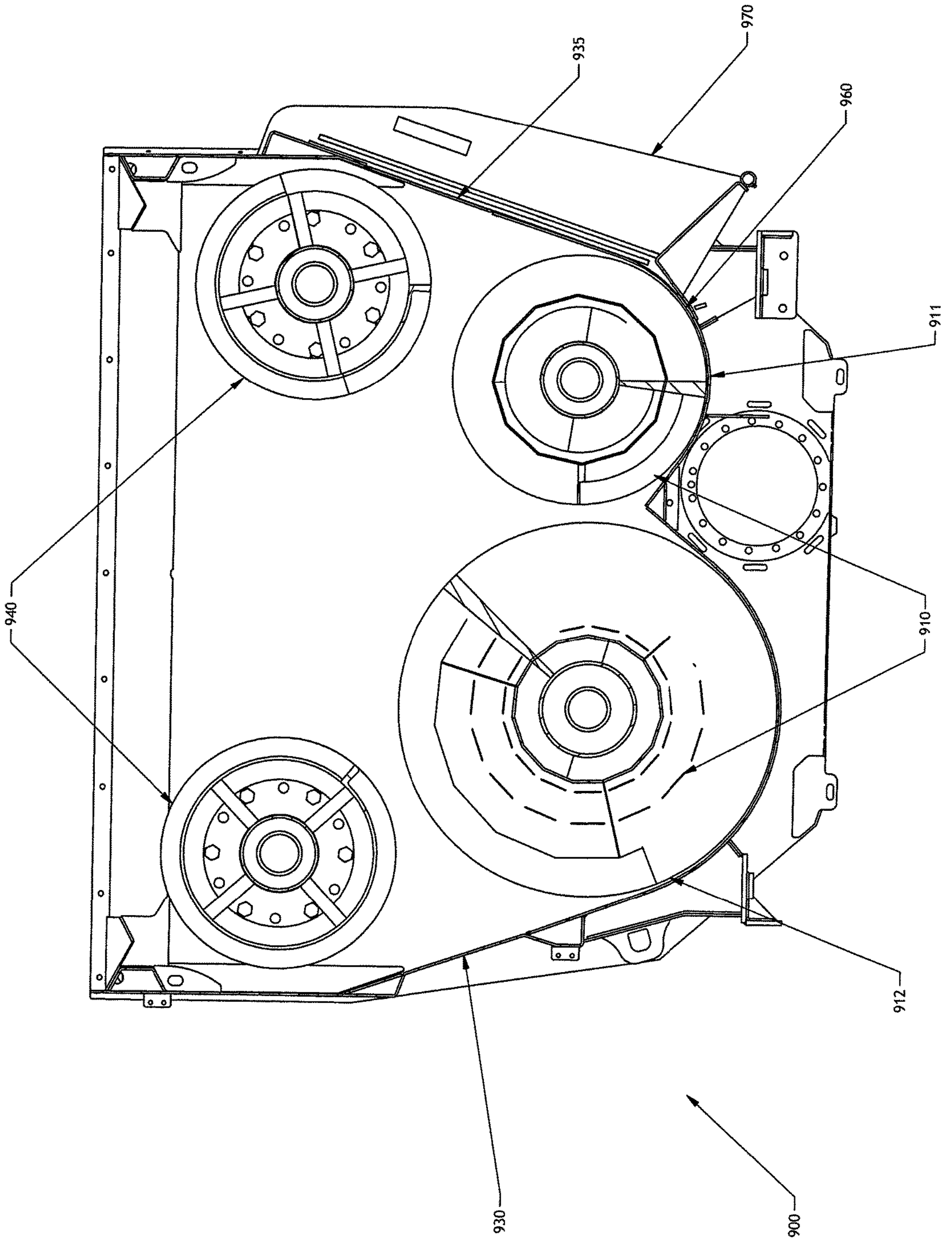
FIG. 9C is an end view illustrative of the bulk mixer and coned ribbon auger as shown in FIG. 9A.

FIGS. 9A, 9B and 9C show a mixer 900 for mixing a bulk material. The mixer 900 has an open top into which bulk material, such as bulk agricultural material, may be placed to be mixed. The mixing container is defined by side walls 930 and 935 that are connected at their bottom ends by a trough 960. A front wall 950 and a rear wall 920 span each end of the mixing container thereby forming the open top mixing container, also referred to as a mixing chamber.

The embodiment of the horizontal mixer 900 shown in FIGS. 9A-9C is a horizontal mixer having a quad auger arrangement and includes two sets of stacked augers as can be more clearly seen in the top view of FIG. 9B and end view of FIG. 9C. The mixer 900 includes bottom coned ribbon augers 910 which are longitudinally positioned in the mixing container. The trough 960 has a W-shape to accommodate the dual bottom coned ribbon augers 910 such that each of the bottom coned ribbon augers is at least somewhat encapsulated or sunk into its own trough.

As can be seen in FIG. 9C, the W-shaped trough 960 is comprised of two parallel troughs each adapted to accommodate its own auger and may be of different sizes based, for example, on the diameter of the auger which is to be accommodated. For example, each bottom coned ribbon auger may have a different diameter and may be positioned at a different height. It will be appreciated that any suitable auger setup may be used and the coned solid and/or ribbon augers of the present invention as defined herein may be adapted to be accommodated by a mixer, or the mixer may be adapted to accommodate a coned solid and/or ribbon auger such as those defined herein. The horizontal mixer description with reference to FIGS. 9A-9C is only one example of a mixer that can use a coned auger or coned ribbon auger of the present invention and is intended to be for illustrative purposes and it is not the intention of the inventors that only horizontal mixers such as that shown in FIG. 9A-9C or 10 and 11 may be used in conjunction with the coned ribbon augers of the invention.

As can be seen in FIGS. 9A-9C, the bottom augers of the horizontal mixer are coned ribbon augers 910. The top augers 940 may be ribbon augers or solid augers. They may also be coned augers.

The mixer 900 comprises an exit door 970 situated at any appropriate position to allow output of mixed material from the mixing chamber. In one embodiment, the exit door 970 may in the side wall 935 of the mixer 900 and may be on the driver side of the mixer 900 thereby allowing a user operating the vehicle towing the mixer to more easily see the exit door 970 in the rear-view mirror and more efficiently exit the cab of the vehicle towing the mixer to access the exit door 970.

As outlined above, the coned ribbon auger on the exit door side 911 has the coned section 990 in-line with or overlapping the exit door 970. The non-exit door side coned ribbon auger 912 has the coned section 980 located at any suitable point along the auger post 921.

The pitch of the bottom augers 910 may be oriented to draw material away from the front wall 950 and the rear wall 920 toward the center of the mixing chamber. The conversion point of each of the bottom auger 910 may be the same or different as shown in FIGS. 9A to 9C.

In the mixer 900 shown with reference to FIGS. 9A-9C the bottom augers 910 may be any suitable coned solid or ribbon auger as described herein or as contemplated by the inventors. The bottom augers 910 shown in FIGS. 9A-9C are a ribbon auger as described with reference to FIGS. 1-2 (bottom ribbon auger 911) and FIGS. 3-4 (bottom ribbon auger 912). The bottom augers 911 and 912 have different diameters, but, it is contemplated that the bottoms augers may have the same diameter and may optionally be have the same positioning of the coned section.

Figure 10:
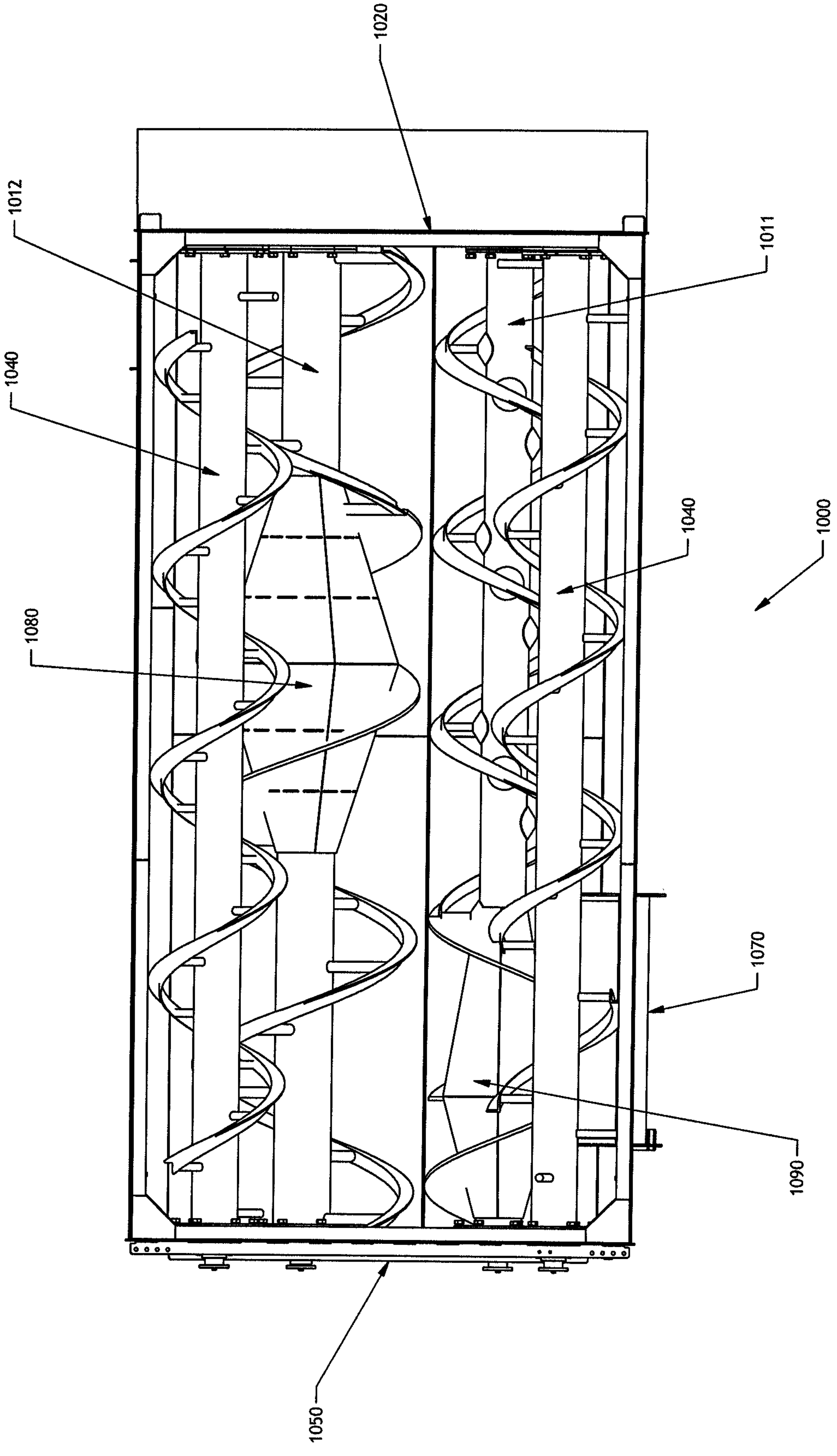
FIG. 10 is a top view illustrative of another embodiment of a bulk mixer comprising another embodiment of a coned ribbon auger according to the invention.
Figure 11:
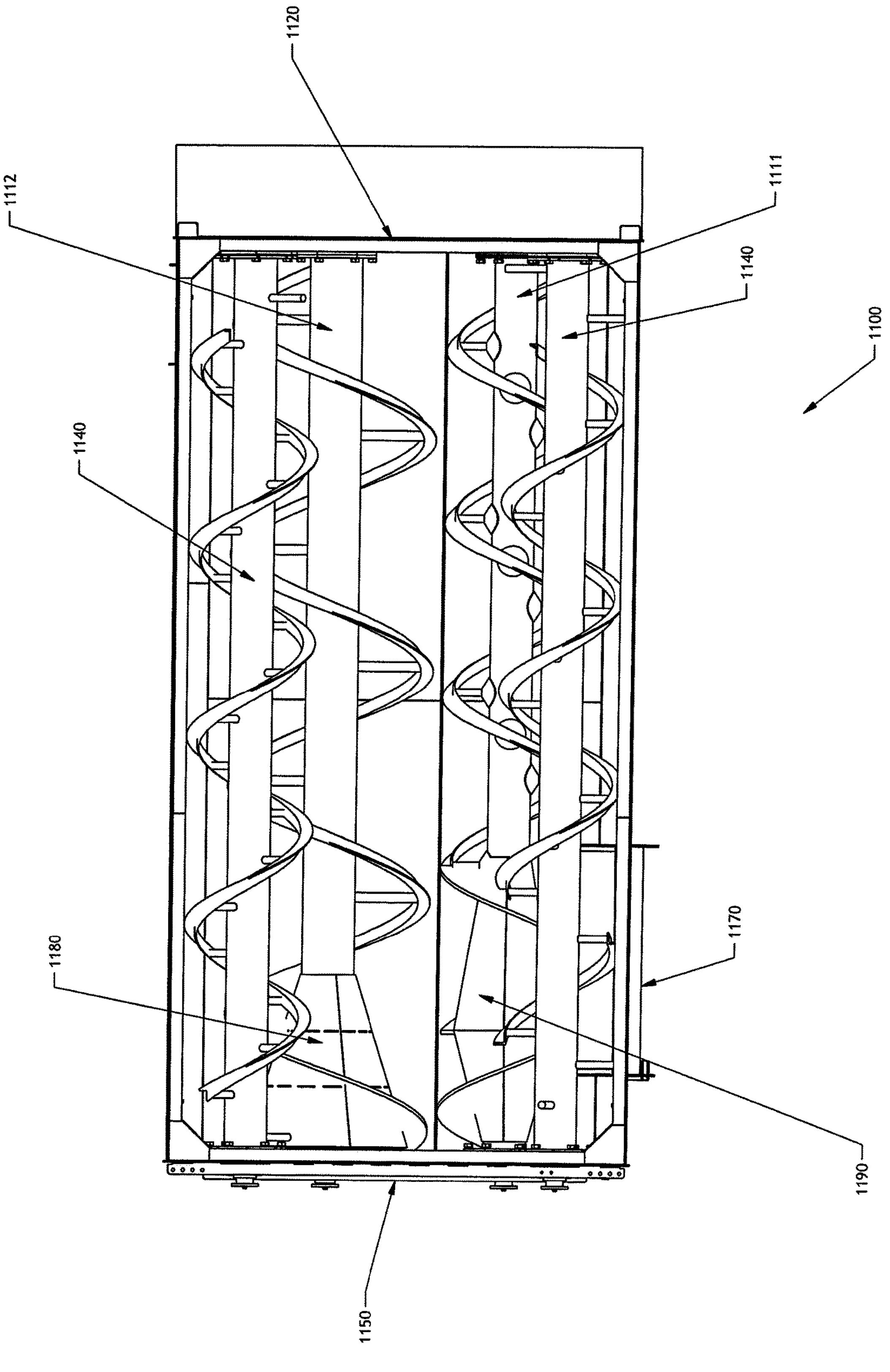
FIG. 11 is a top view illustrative of another embodiment of a bulk mixer comprising another embodiment of a coned ribbon auger according to the invention.

FIGS. 10 and 11 show mixers having two other setups for the bottom coned ribbon augers.

FIG. 10 shows a horizontal mixer 1000 comprising bottom coned ribbon augers including an exit door side coned ribbon auger 1011 and a non-exit door side coned ribbon auger 1012. The coned ribbon auger 1011 has a coned section 1090 which overlaps with the exit door 1070 in the mixer 1000. The coned ribbon auger 1012 has a coned section 1080 positioned along the auger post at a point which does not overlap with the coned section 1090 of the coned ribbon auger 1011. The pitch of the bottom augers 1011 and 1012 may be oriented to draw material away from the front wall 1050 and the rear wall 1020 toward the center of the mixing chamber. The top augers 1040 may be ribbon augers or solid augers. They may also be coned ribbon augers.

FIG. 11 shows a horizontal mixer 1100 comprising bottom coned ribbon augers including an exit door side coned ribbon auger 1111 and a non-exit door side coned ribbon auger 1112. The coned ribbon auger 1111 has a coned section 1190 which overlaps with the exit door 1170 in the mixer 1100. The coned ribbon auger 1112 has a coned section 1180 positioned at a front end of the auger post at a point adjacent the front end of the mixing chamber 1150. The coned section 1180 comprises a single cone such as that described with reference to FIGS. 5-6. The pitch of the bottom auger 1111 may be oriented to draw material away from the rear wall 1120 and the front wall 1150 toward the center of the mixing chamber. The pitch of the coned ribbon auger 1112 is oriented to draw matter in a single direction, in this case from the back of the mixer 1120 toward the front 1150. The top augers 1140 may be ribbon augers or solid augers. They may also be coned ribbon augers.

The exit door side coned ribbon augers and non-exit door side coned ribbon augers described herein may have identical or non-identical diameters. In embodiments with non-identical diameters, the diameter of the exit door side coned ribbon auger may be smaller than the diameter of the non-exit door side coned ribbon auger. In other embodiments, the diameter of the exit door side coned ribbon auger may be larger than the diameter of the non-exit door side coned ribbon auger.

It will be appreciated that any suitable horizontal mixer may be used with any suitable auger set up and orientation and any suitable number of augers. The mixer may comprise a coned ribbon auger, such as one of those defined herein or as contemplated by the inventors, and may have the coned section overlap with or inline with the exit door of the mixer.

It will be appreciated that the coned auger as described herein may be used in conjunction with paddles mounted to the auger. The paddles may be mounted in any suitable manner and/or position. The paddles may function to aid in mixing and/or unloading of the bulk material.

One or more illustrative embodiments have been described by way of example. It will be understood to persons skilled in the art that a number of variations and modifications can be made without departing from the scope and spirit of the invention as defined herein and in the claims. Such modifications and variations are within the intended scope of the invention and the contemplation of the inventors.

The invention claimed is:

1. A coned auger for a horizontal feed mixer, the coned auger comprising:

an auger post having a first end opposite a second end;

flighting extending along and about the auger post, with a first pitch section comprising a pitch oriented to move bulk material generally from the first end toward the second end during operation of the auger;

a coned section along the auger post, the coned section comprising a first cone protruding about the periphery of the auger post, the first cone having a tapered end opposite a wide end;

wherein the flighting comprises ribbon flighting;

wherein the pitch of the flighting is greater than a diameter of the flighting; and wherein the coned section further comprises a second cone protruding from the auger post comprising a tapered end opposite the wide end of the first cone and wherein the second cone has an orientation opposite to the first cone and wherein a wide end of the second cone abuts or is adjacent to the wide end of the first cone; and wherein a taper angle of the first cone and a taper angle of the second cone are different.

2. The coned auger of claim 1, wherein the first cone is positioned substantially at or near the second end of the auger post, the tapered end of the first cone oriented toward the first end of the auger post and the wide end oriented toward the second end of the auger post.

3. The coned auger of claim 1, wherein the flighting further comprises a second pitch section situated opposite the first pitch section and having an orientation to move bulk material generally from the second end of the auger post toward the first end of the auger post, and wherein a position at which the first pitch section meets the second pitch section defines a conversion point, and wherein the coned section overlaps with the conversion point.

4. The coned auger of claim 1, further comprising auger paddles mounted to the auger for aiding unloading of a mixing chamber.

5. The coned auger of claim 1, wherein the first and/or second cone is a round cone or pyramidal cone of 3 or more sides.

6. The coned auger of claim 1, wherein a diameter of the wide end of the first or second cone is less than said diameter of the flighting.

7. The coned auger of claim 1, wherein the first cone and the second cone have a frustum shape.

8. The coned auger of claim 1, wherein a said taper angle of said first cone is 135° or greater.

9. The coned auger of claim 1, wherein said taper angle of the first cone is −175° or greater.

10. The coned auger of claim 1, further comprising plating spanning a gap between the cone section and the ribbon flighting thereby forming solid auger flighting in the coned section.

11. The coned auger of claim 10, wherein the plating is integrated into the flighting in the coned section.

12. A horizontal mixer for mixing feed material, the horizontal mixer comprising:

a mixing chamber for accommodating bulk material to be mixed, the mixing chamber comprising:

side walls connected at their bottom edges by a trough;

a front wall spanning a front side of said mixing chamber;

a rear wall spanning a rear side of said mixing chamber; and an exit door through which mixed material can exit;

one or more bottom augers situated longitudinally in the trough, wherein at least one of the one or more bottom augers is a coned auger comprising:

an auger post having a first end opposite a second end;

flighting extending along and about the auger post, with a first pitch section comprising a pitch oriented to move bulk material generally from the first end toward the second end during operation of the auger;

a coned section along the auger post, the coned section comprising a first cone protruding about a periphery of the auger post, the first cone having a tapered end opposite a wide end;

wherein the flighting comprises ribbon flighting;

wherein the pitch of the flighting is greater than a diameter of the flighting;

wherein the coned section further comprises a second cone protruding from the auger post comprising a tapered end opposite the wide end of said first cone and wherein the second cone has an orientation opposite to the first cone and wherein a wide end of the second cone abuts or is adjacent to the wide end of the first cone; and wherein a taper angle of the first cone and a taper angle of the second cone are different; and at least one top auger situated longitudinally in the mixing chamber substantially above the at least one bottom auger, wherein the trough has a shape to accommodate the at least one bottom auger.

13. The horizontal mixer of claim 12, wherein said flighting comprises said first pitch section which is oriented to move bulk material generally from the front wall toward the exit door and a second pitch section situated opposite the first pitch section and having an orientation to move bulk material generally from the rear wall toward the exit door of the mixing chamber, and wherein a position wherein the first pitch section meets the second pitch section defines a conversion point, and wherein the coned section overlaps with the conversion point.

14. The horizontal mixer of claim 12, wherein one of said cones has said taper angle of at least 135°.

15. The horizontal mixer of claim 12, wherein the coned auger is an exit door side bottom auger situated on the side of the mixing chamber comprising the exit door and the horizontal mixer further comprises a non-exit door side bottom auger situated on the side of the mixing chamber opposite the exit door side; wherein the non-exit door side bottom auger is also a coned auger.

16. The horizontal mixer of claim 15, wherein the wide end of the first or second cone of the exit door side bottom auger and a wide end of a first or second cone of the non-exit door side bottom auger have non-identical diameters.

17. The horizontal mixer of claim 15, wherein a coned section of the non-exit door side bottom auger overlaps with the coned section of the exit door side bottom auger.

18. The horizontal mixer of claim 15, wherein the coned section of the exit door side bottom auger is comprised of the first and/or second cone having a different taper angle than a first and/or second cone of the non-exit door side bottom auger.

19. A coned auger for a horizontal feed mixer, the coned auger comprising:

an auger post having a first end opposite a second end;

flighting extending along and about the auger post, with a first pitch section comprising a pitch oriented to move bulk material generally from the first end toward the second end during operation of the auger;

a coned section along the auger post, the coned section comprising a first cone protruding about the periphery of the auger post, the first cone having a tapered end opposite a wide end; wherein the flighting comprises ribbon flighting and plating spanning a distance from the flighting to the first cone, in the coned section thereby forming solid auger flighting in the coned section;

wherein the pitch of the flighting is greater than a diameter of the flighting wherein the coned section further comprises a second cone protruding from the auger post comprising a tapered end opposite a wide end and wherein the second cone has an orientation opposite to the first cone and wherein the wide end of the second cone abuts or is adjacent to said wide end of the first cone; and wherein a taper angle of the first cone and a taper angle of the second cone are different.

* * * * *